G. L. MOORE.
SIGHT FEED LUBRICATOR FOR AUTOMOBILES.
APPLICATION FILED OCT. 31, 1919.
1,333,814. Patented Mar. 16, 1920.
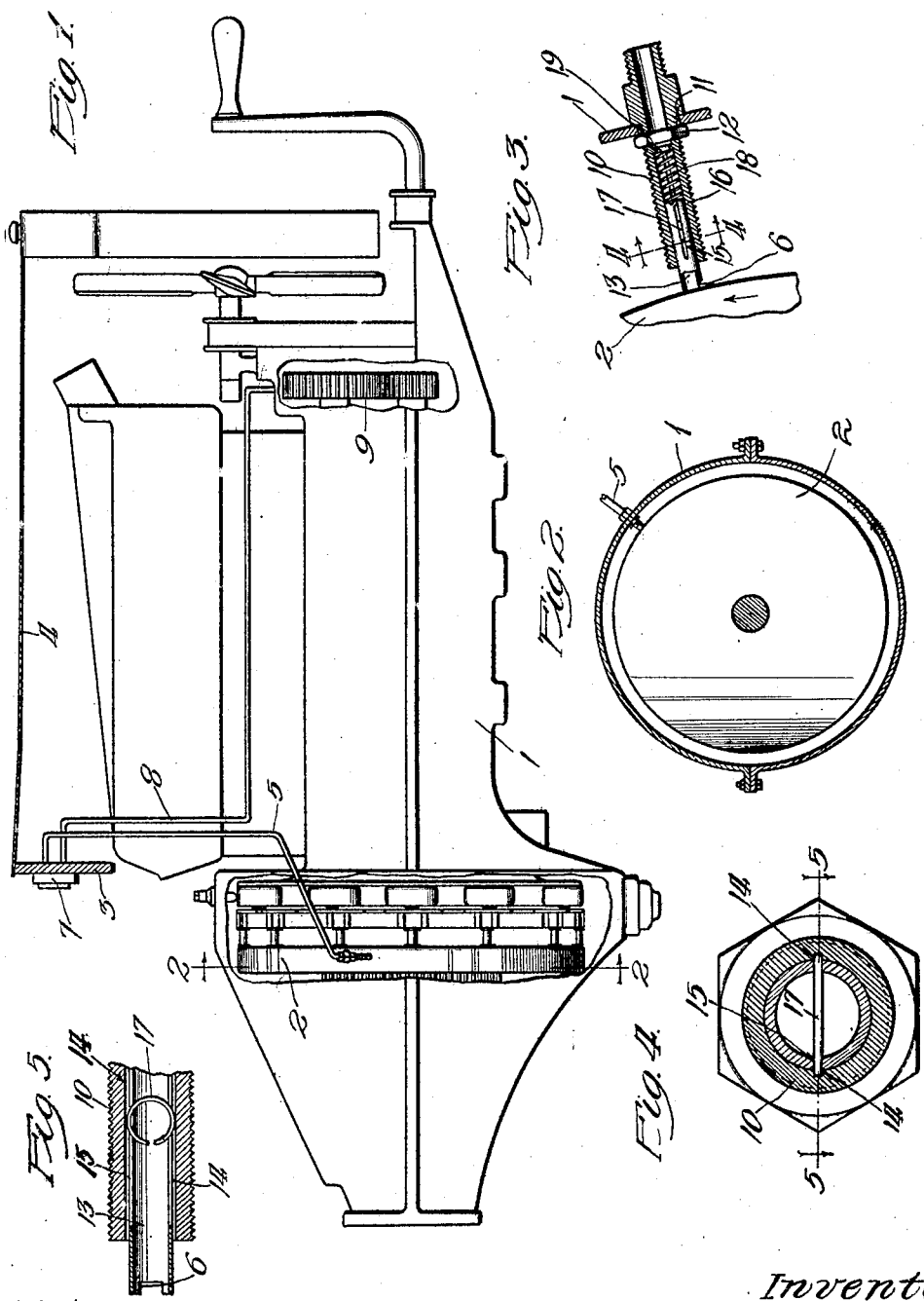

UNITED STATES PATENT OFFICE.

GEORGE L. MOORE, OF CHICAGO, ILLINOIS, ASSIGNOR OF ONE-HALF TO WINTHROP BURDICK, OF CHICAGO, ILLINOIS.

SIGHT-FEED LUBRICATOR FOR AUTOMOBILES.

1,333,814.  Specification of Letters Patent.  Patented Mar. 16, 1920.

Application filed October 31, 1919. Serial No. 334,758.

*To all whom it may concern:*

Be it known that I, GEORGE L. MOORE, a citizen of the United States, residing at Chicago, in the county of Cook and State of Illinois, have invented a certain new and useful Improvement in Sight-Feed Lubricators for Automobiles, and declare the following to be a full, clear, and exact description of the same, such as will enable others skilled in the art to which it pertains to make and use the same, reference being had to the accompanying drawings, which form a part of this specification.

In the Ford automobiles there is no provision made for clearly indicating to the driver the condition of the oil in the crank case. The object of the present invention is to produce a simple and novel attachment by means of which an indication will be made at the dash-board, or at some other convenient point, of the presence of an amount of oil above the danger point in the crank case of the engine of a Ford automobile or a similar engine. A further object of the present invention is to produce an automatic feed of the oil from the bottom of the crank case of a Ford engine or the like to parts to be lubricated, at the same time make the flow of the oil visible to the driver.

The various features of novelty whereby my invention is characterized will hereinafter be pointed out with particularity in the claims; but, for a full understanding of my invention, and of its objects and advantages, reference may be had to the following detailed description taken in connection with the accompanying drawing:

Figure 1 is a central longitudinal vertical section through the hood and dash of a Ford automobile, the engine being shown in elevation;

Fig. 2 is a section taken approximately on line 2—2 of Fig. 1;

Fig. 3 is a section on a much larger scale in a plane approximately on line 3—3 of Fig. 1, only a fragment of the structure being illustrated;

Fig. 4 is a section taken approximately on line 4—4 of Fig. 3 but on a larger scale than the latter figure; and Fig. 5 is a section taken approximately on line 5—5 of Fig. 4.

Referring to the drawing, 1 represents the crank case of an automobile engine, in the present instance a Ford engine, and 2 is the fly-wheel of the engine. The automobile dash is indicated at 3. All of these parts may take any usual or preferred forms although, as heretofore stated, the invention is particularly applicable to Ford automobiles.

In accordance with my invention, I place beside the engine, preferably under the hood 4, an oil conduit, 5. The lower end of the conduit may conveniently be screwed through the wall of the crank casing, as best shown in Fig. 2, in the plane of the fly-wheel so that the free end of the conduit may be brought close to the fly-wheel. The part of the conduit within the crank case, in the vicinity of the wheel, is preferably approximately radial to the fly-wheel and, as best indicated in Figs. 2 and 3, is provided on the under side with a slot, 6. The conduit is placed on the side of the fly-wheel which carries oil upwardly from the bottom of the crank case, and is so positioned that the oil which is carried upwardly as far as the conduit enters the slot, 6, in the conduit under considerable pressure or momentum, while still adhering to the fly-wheel, and may therefore be caused to travel a considerable distance through the conduit.

The oil conduit is carried up behind the dash and communicates with the upper end of a transparent tube or box, 7, placed on the front side of the dash. A discharge conduit, 8, leads from the lower end of the member 7 back to the engine. The conduit, 8, may discharge into the crank case at any suitable point, but is preferably carried to the front end of the engine so as to discharge upon the gears 9 found at that point; thus automatically lubricating these gears in a positive manner as long as there is sufficient oil in the crank case to enable the fly-wheel to carry some of it upwardly and force it through the conduits.

As long as there is sufficient oil in the crank case to insure proper lubrication, the fly-wheel will be able to feed the oil through the conduits 5 and 8, such flow being visible to the driver by reason of the indicator 7. As soon as the oil drops below the danger point, so that the oil is churned into a froth, the feed of the oil ceases, and the driver is instantly apprised of the fact.

It is necessary that the receiving or inlet end of the conduit be kept in close contact with the periphery of the fly-wheel and to this end I have provided the means for securing automatic adjustment best illustrated in Figs. 3, 4 and 5. Referring to these figures, it will be seen that the inlet end of the conduit is formed of a nipple, 10, passing through the wall of the crank casing and conveniently held in place by means of a shoulder, 11, on the exterior of the crank casing wall and a nut, 12, on the inner side of said wall. Instead of forming the slot 6 directly in the rigid nipple, I prefer to form it in a small tubular element, 13, telescoped into the inner end of the nipple; the nipple therefore terminating a short distance from the periphery of the fly-wheel. The tube, 13, fits into the nipple so that it may freely slide in the longitudinal direction but it is held against a turning movement so as to prevent the slot or inlet opening, 6, from becoming displaced. In the arrangement shown, the nipple is provided in the interior with two longitudinal slots or grooves, 14, disposed at opposite sides of the nipple, extending longitudinally of the nipple and parallel with each other. The member 13 is provided with oppositely-disposed longitudinal slots, 15, which, when the slot or opening, 6, is properly positioned relatively to the fly-wheel, register with the slots or grooves, 14, in the walls of the nipple. The slots, 15, do not extend entirely to the outer end of the member 13 and their inner ends are also closed in any suitable manner. Since these slots may conveniently be cut by means of a saw they are preferably continued through the inner or rear end of the member 13 and are then closed by displacing some of the metal laterally at said end, as indicated at 16, in order to form a stop or shoulder. An open spring ring, 17, extends through the slots 15 in the member 13 and projects into the slots or grooves, 14, in the nipple; the tendency of the ring being to expand to a diameter slightly greater than the distance from the bottom of one of the slots, 14, to the bottom of the opposite slot, so that when the ring is sprung into position it will be frictionally held against displacement. With this arrangement, the spring ring serves as a stop to prevent rotary movements of the member 13 and to limit the longitudinal movements so that this part will not accidentally drop out of the nipple. However, the ring will yield if sufficient pressure is applied and therefore the member 13 may readily be inserted into or removed from the nipple.

In order positively to hold the member 13 against the fly-wheel I prefer to place behind said member, within the nipple, a spring, 18, one end of which engages with the member 13 and the other with a suitable stop or shoulder, 19, in the nipple.

While I have illustrated and described with particularity only a single preferred form of my invention, I do not desire to be limited to the exact structural details thus illustrated and described; but intend to cover all forms and arrangements which come within the terms employed in the definitions of my invention constituting the appended claims.

I claim:

1. The combination with an engine having a fly-wheel operating in an oil case adapted to be partially filled with oil, of an oil conduit extending from the vicinity of the fly-wheel to a remote point, said conduit having an inlet section open at the end yieldingly held against the fly-wheel with its open end closed by the fly-wheel, and said inlet section having a notch at said open end in the side directed toward the oncoming oil carried upwardly on the surface of the fly-wheel.

2. The combination with an engine having a fly-wheel operating in an oil case adapted to be partially filled with oil, of an oil conduit extending from the vicinity of the fly-wheel to a remote point, said conduit having a movable telescoped section engaging at one end with the fly-wheel, means for preventing said section from rotating while permitting it to move lengthwise and said section having at said end a notch in the side directed toward the oncoming oil carried upwardly on the fly-wheel.

3. The combination with an engine having a fly-wheel operating in an oil case adapted to be partially filled with oil, of an oil conduit extending from the vicinity of the fly-wheel to a remote point, a tube fitting slidingly into one end of the conduit and held against rotation therein, said tube engaging at one end with the fly-wheel, a spring acting on said tube to press it yieldingly against the fly-wheel, and said tube having at said end a notch in the side directed toward the oncoming oil carried upwardly on the fly-wheel.

4. The combination with an engine having a fly-wheel operating in an oil case adapted to be partially filled with oil, of an oil conduit extending from the vicinity of the fly-wheel to a remote point, a tube fitting slidingly into one end of the conduit and held against rotation therein, said tube engaging at one end with the fly-wheel, a spring acting on said tube to press it yieldingly against the fly-wheel, and said tube having at said end a notch in the side directed toward the oncoming oil carried upwardly on the peripheral surface of the fly-wheel.

5. The combination with an engine having a fly-wheel operating in an oil case adapted to be partially filled with oil, of an oil conduit extending from the vicinity of the fly-wheel to a remote point, said conduit having a movable telescoped section engaged at one end with the fly-wheel, means for preventing said section from rotating while permitting it to move lengthwise and said section having at said end a notch in the side directed toward the oncoming oil carried upwardly on the fly-wheel.

6. In a device of the character described, a nipple adapted to be secured to an engine crank case with one end directed toward the engine fly-wheel, and a tubular member telescoped into said end of said nipple and held against rotary movements therein while permitted to move lengthwise, said tubular member projecting from said nipple at one end and having a small notch in one side thereof at said end.

7. In a device of the character described, a nipple adapted to be secured to an engine crank case with one end directed toward the engine fly-wheel, a tubular member telescoped into said end of said nipple and held against rotary movements therein while permitted to move lengthwise, said tubular member projecting from said end of the nipple and having a small notch in one side thereof in the projecting end, and a spring within the nipple behind said tubular member tending to press it outwardly.

8. In a device of the character described, a nipple having internal longitudinally-extending grooves at opposite sides thereof, a tube telescoped into the nipple and projecting at one end therefrom, said tube having longitudinal slots therethrough beginning at a distance from said end and registering with said grooves, and an open spring ring extending across said tube through said slots and entering said grooves, said ring being of sufficient diameter to cause it to be placed under tension when entered into said grooves and thus be held frictionally against movement lengthwise of the grooves.

9. The combination with an engine having a fly-wheel operating in a crank case, of an oil pipe having a slot or notch cut into the edge of the pipe at one end on one side thereof, and means for supporting said pipe so as to hold it yieldably against the fly-wheel with said notch or slot facing in the direction to meet the oil adhering to the surface of the fly-wheel as the said surface carries oil upwardly from the bottom of the crank case, a conduit connected to said pipe, said conduit including a transparent portion to serve as an indicator and a return portion to carry the oil back to the engine.

In testimony whereof, I sign this specification.

GEORGE L. MOORE.